(12) United States Patent
Nagai et al.

(10) Patent No.: US 11,028,209 B2
(45) Date of Patent: Jun. 8, 2021

(54) CONDUCTIVE RESIN COMPOSITION FOR ELECTRODES, ELECTRODE COMPOSITION, ELECTRODE USING SAME AND LITHIUM ION BATTERY

(71) Applicant: Denka Company Limited, Tokyo (JP)

(72) Inventors: Tatsuya Nagai, Tokyo (JP); Takuya Narutomi, Tokyo (JP); Tetsuya Ito, Tokyo (JP); Hiroshi Yokota, Tokyo (JP)

(73) Assignee: Denka Company Limited, Tokyo (JP)

( * ) Notice: Subject to any disclaimer, the term of this patent is extended or adjusted under 35 U.S.C. 154(b) by 202 days.

(21) Appl. No.: 16/320,646

(22) PCT Filed: Jul. 14, 2017

(86) PCT No.: PCT/JP2017/025758
§ 371 (c)(1),
(2) Date: Apr. 15, 2019

(87) PCT Pub. No.: WO2018/021073
PCT Pub. Date: Feb. 1, 2018

(65) Prior Publication Data
US 2019/0248944 A1    Aug. 15, 2019

(30) Foreign Application Priority Data

Jul. 28, 2016  (JP) .............................. JP2016-148198

(51) Int. Cl.
*H01M 4/505*   (2010.01)
*H01M 4/525*   (2010.01)
(Continued)

(52) U.S. Cl.
CPC ............ *C08F 261/04* (2013.01); *C08F 20/44* (2013.01); *C08K 3/04* (2013.01); *C08L 27/16* (2013.01);
(Continued)

(58) Field of Classification Search
CPC ..... C08F 261/04; C08F 20/44; H01M 4/1391; H01M 10/0525; H01M 4/623; H01M 4/505; H01M 4/525; C08K 2201/001
See application file for complete search history.

(56) References Cited

U.S. PATENT DOCUMENTS

2015/0050555 A1*  2/2015  Fukumine ............. H01M 4/622
                                                        429/217
2016/0240854 A1*  8/2016  Sakurai ................. H01M 4/625
2018/0358624 A1   12/2018 Narutomi et al.

FOREIGN PATENT DOCUMENTS

JP    2012-059466 A    3/2012
JP    2015-125964 A    7/2015
(Continued)

OTHER PUBLICATIONS

Extended European Search Report dated Jun. 28, 2019, in counterpart EP Application No. 17834081.6.

*Primary Examiner* — Stewart A Fraser
(74) *Attorney, Agent, or Firm* — Foley & Lardner LLP (57) ABSTRACT

[Problem]
To provide a conductive resin composition for electrodes which is excellent in dispersibility and oxidation resistance. To provide: an electrode composition employing the conductive resin composition for electrodes and having a low viscosity; an electrode employing the electrode composition and having a low electrode plate resistance; and a lithium ion battery having a high energy density, high output characteristics and a high cyclability.
[Solution]
A conductive resin composition for electrodes, comprising a dispersant, a conductive agent, and a binding material, wherein: the dispersant comprises a graft copolymer in which a monomer containing acrylonitrile as a main component is grafted onto polyvinyl alcohol; the average degree
(Continued)

of polymerization of the polyvinyl alcohol is 300 to 3,000 and the degree of saponification of the same is 90 mol % to 100 mol %; and the polyvinyl alcohol content and the polyacrylonitrile content in the graft copolymer are, respectively, 10 mass % to 40 mass % and 90 mass % to 60 mass %.

8 Claims, 1 Drawing Sheet

(51) Int. Cl.
*H01M 4/62* (2006.01)
*H01M 4/58* (2010.01)
*H01M 4/1391* (2010.01)
*H01M 10/0525* (2010.01)
*C08F 261/04* (2006.01)
*C08L 27/16* (2006.01)
*C08F 20/44* (2006.01)
*C08K 3/04* (2006.01)

(52) U.S. Cl.
CPC ......... *H01M 4/1391* (2013.01); *H01M 4/505* (2013.01); *H01M 4/525* (2013.01); *H01M 4/5825* (2013.01); *H01M 4/62* (2013.01); *H01M 4/623* (2013.01); *H01M 4/625* (2013.01); *H01M 10/0525* (2013.01); *C08K 2201/001* (2013.01); *C08L 2203/20* (2013.01)

(56) References Cited

FOREIGN PATENT DOCUMENTS

| WO | WO 2012/014616 A1 | 2/2012 |
| WO | WO 2015/053224 A1 | 4/2015 |
| WO | WO-2018/230597 A1 | 12/2018 |

* cited by examiner

CONDUCTIVE RESIN COMPOSITION FOR ELECTRODES, ELECTRODE COMPOSITION, ELECTRODE USING SAME AND LITHIUM ION BATTERY

CROSS-REFERENCE TO RELATED APPLICATIONS

This application is a National Stage application of PCT/JP2017/025758, filed Jul. 14, 2017, which claims priority from Japanese application JP 2016-148198, filed Jul. 28, 2016.

TECHNICAL FIELD

The present invention relates to a conductive resin composition for electrodes, an electrode composition, and an electrode and a lithium ion battery using the same.

BACKGROUND ART

Reflecting the increased concern for environmental and energy issues, techniques have been actively developed toward realization of a low carbon society that is less dependent on fossil fuel. Such technical developments range widely, and examples thereof include: development of a low-pollution vehicle such as a hybrid electric vehicle and an electric vehicle; development of natural energy power generation, such as solar power generation and wind power generation, and a power storage system; and development of a next-generation transmission network that supplies electric power efficiently and reduces transmission loss.

One of the key devices commonly needed in these techniques is a battery, and such a battery is required to have a high energy density to miniaturize the system. The battery is also required to have high output characteristics to make it possible to stably supply power without being affected by the temperature of the usage environment. Moreover, excellent cyclability, etc., is also required in order to be durable for long time use. As a result, conventional lead storage batteries, nickel-cadmium batteries, and nickel-hydrogen batteries are rapidly being replaced with a lithium ion secondary battery which has higher energy density, output characteristics and cyclability.

In recent years, further improvement of the energy density of the lithium ion secondary battery is required. To this end, the content of a conductive agent in the composite electrode material is required to be lowered further. For instance, in consumer appliances such as digital equipment, it is deemed to be preferable that the content of the conductive agent in the composite positive electrode material should be typically 2 mass % or less, and more preferably 1 mass % or less. Under such circumstances, carbon black, which is a conductive agent, is required to exert sufficient electron conductivity even if the amount thereof added is small.

Carbon black has a common structure in which primary particles having an almost spherical shape are linked together like beads, and such a structure is called "the structure". In general, the smaller the primary particle diameter is, the more electric contacts there should be in a conductive agent of the same mass, which improves electron conductivity. Also, the longer the structure is linked, the larger is a distance in which electron conduction is possible without contact resistance, and therefore electron conductivity is improved.

Meanwhile, while carbon black having a small primary particle diameter and long structure is excellent in conductivity, it is not readily crushed and readily coagulates because the interaction between particles is large. Accordingly, when electrodes are produced, a method generally used in which an electrode composition having an active material, a conductive agent, and a binding material dispersed in water or an organic solvent is applied to a metal foil, but when carbon black having a small primary particle diameter and long structure is used as a conductive agent, poor dispersion of the conductive agent readily occurs, for instance, a coagulation of the conductive agent remains in the electrode composition and causes irregularity on the electrode, or the viscosity of the electrode composition is too high and application thereof become impossible.

In order to overcome such problems, Patent Document 1, for example, proposes performing two-step kneading including thick kneading and dilution dispersion. However, this method does not necessarily exert a sufficient effect on carbon black having a small primary particle size and long structure as mentioned above.

Also, as a means for overcoming poor dispersion of a conductive agent, there is a method in which a polyvinyl pyrrolidone-based polymer and a nonionic surfactant are added as dispersants (Patent Document 2). However, although the method disclosed in Patent Document 2 can improve poor dispersion of a conductive agent, there was a problem in that when the electrode containing the dispersant is used as a lithium ion battery, the dispersant undergoes oxidation decomposition at a voltage of 4.45 V or higher, which lowers the capacity of the battery. In the present lithium ion secondary battery market, a high voltage battery is desired, and accordingly, a conductive resin composition for electrodes containing a dispersant having both dispersibility and oxidation resistance is essential.

Patent Document 1: Japanese Patent Laid-Open No. 2012-59466
Patent Document 2: International Publication No. WO 2012/014616

SUMMARY OF INVENTION

In view of the above issues and circumstances, the problem of the present invention is to provide a conductive resin composition for electrodes which is excellent in dispersibility and oxidation resistance. Another problem is to provide: an electrode composition excellent in dispersibility which is produced by using the conductive resin composition for electrodes; an electrode produced by using the electrode composition and having a low resistance and an excellent binding capacity; and a lithium ion battery having excellent high output characteristics and excellent cyclability.

As a result of comprehensive study for achieving the above objects, the present inventors found that the dispersibility of the conductive agent can be improved and high oxidation resistance of the conductive resin composition for electrode can be achieved by adding, as a dispersant, a polymer in which a monomer containing acrylonitrile as a main component is grafted onto polyvinyl alcohol, to the composition.

Specifically, the present invention that solves the above problems is configured from the following.
(1) A conductive resin composition for electrodes, comprising a dispersant, a conductive agent, and a binding material, wherein:
the dispersant comprises a graft copolymer in which a monomer containing acrylonitrile as a main component is grafted onto polyvinyl alcohol;

the average degree of polymerization of the polyvinyl alcohol is 300 to 3,000, and the degree of saponification thereof is 90 to 100 mol %; and the polyvinyl alcohol content and the polyacrylonitrile content in the graft copolymer are, respectively, 10 mass % to 40 mass % and 90 mass % to 60 mass %.

(2) The conductive resin composition for electrodes according to (1), wherein the mass ratio of the dispersant to the conductive agent (mass of the dispersant/mass of the conductive agent) is 0.01 to 1.

(3) The conductive resin composition for electrodes according to (1) or (2), wherein the binding material comprises polyvinylidene fluoride.

(4) The conductive resin composition for electrodes according to any one of (1) to (3), wherein the conductive agent comprises at least one selected from the group consisting of (i) fibrous carbon, (ii) spherical carbon, and (iii) a carbon composite in which fibrous carbon and spherical carbon are interconnected.

(5) An electrode composition, comprising the conductive resin composition for electrodes according to any one of (1) to (4), and an active material.

(6) The electrode composition according to (5), wherein the active material is at least one selected from $LiCoO_2$, $LiMn_2O_4$, $LiNiO_2$, $LiMPO_4$, $Li_2MSiO_4$, $LiNi_xM_{n(2-x)}O_4$, $Li(Mn_xNi_yCo_Z)O_2$, $Li(Al_xNi_yCo_Z)O_2$, and $xLi_2MnO_3$-(1-x)$LiMO_2$, wherein X in $LiNi_xM_{n(2-x)}O_4$ satisfies the relation 0<X<2, X, Y, and Z in $Li(Mn_xNi_yCo_Z)O_2$ and $Li(Al_xNi_yCo_Z)O_2$ satisfy the relation X+Y+Z=1, and each satisfies the relation 0<X<1, 0<Y<1, and 0<Z<1, x in $xLi_2MnO_3$-(1-x)$LiMO_2$ satisfies the relation 0<x<1, and M in $LiMPO_4$, $Li_2MSiO_4$, and $xLi_2MnO_3$-(1-x)$LiMO_2$ is at least one element selected from Fe, Co, Ni, and Mn.

(7) An electrode having a layer comprising the electrode composition according to (5) or (6) on a metal foil; or an electrode comprising the electrode composition according to (5) or (6) applied onto a metal foil.

(8) A lithium ion battery having the electrode according to (7) as a positive electrode; or a lithium ion battery using the electrode according to (7) as a positive electrode.

BRIEF DESCRIPTION OF DRAWINGS

FIG. 1 is a schematic view of a lithium ion battery used for the present embodiment.

FIG. 2 is a scanning electron micrograph of an electrode produced by using a conductive resin composition for electrodes of Example 1.

DESCRIPTION OF EMBODIMENTS

As a result of comprehensive study, the inventors found that a low viscosity and a high oxidation resistance can both be achieved by improving dispersibility of a conductive agent by adding, as a dispersant, a graft copolymerization reactant in which the average degree of polymerization of polyvinyl alcohol is 30 to 3000, the degree of saponification is 90 mol % to 100 mol %, the polyvinyl alcohol content is 10 mass % to 40 mass %, and the polyacrylonitrile content is 90 mass % to 60 mass %, to the conductive resin composition for electrodes containing a conductive agent and a binding material. In addition, the effect of reducing the viscosity of the electrode composition produced by using the conductive resin composition for electrodes is also high, and the electrode produced by using the same has a low electrode plate resistance, and the lithium ion battery is characterized by having excellent high output characteristics and excellent cyclability.

Hereinafter, the present invention will be described in detail. The present invention is not limited to the embodiments described in the following. In the specification of the present application, the term "to" between two numbers means a range of "equal to or more than" the left side value and "equal to or less than" the right side value. For example, "A to B" means A or more and B or less.

[Conductive Resin Composition for Electrodes]

The conductive resin composition for electrodes of the present embodiment is a conductive resin composition for electrodes containing a dispersant, a conductive agent, and a binding material. Hereinafter, the components of the present invention will be described in detail.

<Dispersant>

The dispersant contains a graft copolymer (hereinafter, also, simply called "the graft copolymer") in which a monomer containing acrylonitrile as a main component is grafted onto polyvinyl alcohol (hereinafter, sometimes abbreviated as "PVA") (hereinafter, also, simply called "the graft copolymer"). This graft copolymer is a graft copolymer in which side branches of polyacrylonitrile (hereinafter, sometimes abbreviated as "PAN") are formed on a main chain of polyvinyl alcohol (a graft copolymer having a main chain containing polyvinyl alcohol and a side chain containing polyacrylonitrile). In the present specification, the "graft copolymer" includes, besides a graft copolymer itself, a mixture of a homopolymer of PAN and/or a homopolymer of PVA, which are not involved in the graft copolymerization. Accordingly, the dispersant used in the present embodiments may contain a PAN homopolymer and/or a PVA homopolymer as a resin (polymer), in addition to a graft copolymer itself.

A polyvinyl alcohol refers to a compound having a polyvinyl alcohol moiety. For instance, conventionally known polyvinyl alcohols, including a modified compound in which polyvinyl alcohol is partially acetalized or butyralized, may be used.

The degree of saponification of PVA is 90 mol % to 100 mol % in view of oxidation resistance, and preferably 95 mol % or more to increase coating of the active material. The degree of saponification of PVA herein is a value measured by a method according to JIS K 6726.

The average degree of polymerization of PVA is 300 to 3,000 in view of solubility and dispersibility of the conductive resin composition for electrodes. The average degree of polymerization of PVA is preferably 320 to 2,950, more preferably 500 to 2,500, and still more preferably 500 to 1,800. When the average degree of polymerization of PVA is less than 300, dispersibility of the active material and the conductive agent may be lowered when an electrode is formed therefrom, leading to lowered durability. When the average degree of polymerization of PVA is more than 3,000, the solubility lowers and the viscosity increases, making the conductive resin composition for electrodes difficult to produce. The average degree of polymerization of PVA, herein, is measured by a method according to JIS K 6726.

The monomer to be grafted onto PVA contains acrylonitrile as an essential component in view of oxidation resistance. Monomers to be grafted onto PVA may include, as a component that may be used in combination with acrylonitrile, within a range not sacrificing the oxidation resistance of the conductive resin composition for electrodes, ethylenic unsaturated carboxylates such as methyl methacrylate, methyl acrylate, ethyl acrylate, butyl acrylate, 2-ethylhexyl methacrylate, and 2-ethylhexyl acrylate; ethylenic unsaturated carboxylic acids such as (meth)acrylic acid, anhydrous maleic acid, and itaconic acid; and styrene. These components may be used alone or in combinations of two or more.

Acrylonitrile in a monomer to be grafted onto PVA is a main component in the graft-copolymerized monomers, and preferably is in an amount of 50 mass % or more of the graft-copolymerized monomers, and more preferably 90 mass % or more. When acrylonitrile accounts for 90 mass % or more of the graft-copolymerized monomers, the oxidation resistance and dispersibility of the conductive resin composition for electrodes can be increased more. The composition of the monomers grafted onto PVA can be determined by $^1$H-NMR (Proton nuclear magnetic resonance method).

The graft ratio of the graft copolymer is preferably 150% to 900%, and more preferably 300% to 570%. By setting the graft ratio at 150% or more, oxidation resistance can be prevented from lowering. Also, by setting the graft ratio at 900% or less, dispersibility can be prevented from lowering. When synthesizing a graft copolymer (during graft copolymerization), a homopolymer of PAN can be produced, and so a step of separating a homopolymer of PAN from the graft copolymer is necessary for calculating the graft ratio. A homopolymer of PAN is soluble in dimethyl formamide (hereinafter, sometimes abbreviated as "DMF"), but PVA and a graft-copolymerized PAN are not soluble in DMF. By utilizing this difference in solubility, the homopolymer of PAN can be separated by an operation such as centrifugation.

Specifically, a composition containing a graft copolymer (graft copolymerization reactant) is immersed in a predetermined amount of DMF to dissolve a homopolymer of PAN in DMF. Subsequently, the immersed liquid is divided into a DMF soluble fraction and a DMF insoluble fraction by use of centrifugation.

In this regard, given that:
a: Mass of a composition containing the graft copolymer used in the measurement,
b: Mass % of PAN in the composition containing the graft copolymer used in the measurement, and
c: Mass of DMF insoluble fraction,
the graft ratio can be obtained by Formula (1) below.

$$\text{Graft ratio} = [c - a \times (100-b) \times 0.01]/[a \times (100-b) \times 0.01] \times 100(\%) \quad (1)$$

b (mass % of PAN in the composition containing the graft copolymer used in the measurement) can be calculated by Formula (2) described later. The graft ratio obtained by Formula (1) is defined by [amount of PAN grafted onto PVA]/[amount of PVA in a composition containing a graft copolymer]×100(%).

The graft ratio of the graft copolymer obtained by Formula (1) is preferably 150% to 900% from the viewpoint of enhancing coating of an active material.

The PVA amount in the graft copolymer is 10 mass % to 40 mass %, and preferably 10 mass % to 20 mass %. When the PVA amount is less than 10 mass %, binding capacity and dispersibility may be lowered. When the PVA amount is more than 40 mass %, oxidation resistance may be lowered.

Herein, "the PVA amount in the graft copolymer" means the PVA amount and amount of the homopolymer of PVA in the graft copolymer, relative to the total of the graft copolymer, homopolymer of PAN, and homopolymer of PVA on mass basis.

The PAN amount in the graft copolymer is 90 mass % to 60 mass %, and is preferably 90 mass % to 80 mass %. When the PAN amount is more than 90 mass %, binding capacity and dispersibility may be lowered. When the PAN amount is less than 60 mass %, oxidation resistance may be lowered.

Herein, the "PAN amount in the graft copolymer" means the PAN amount and amount of the homopolymer of PAN in the graft copolymer, relative to the total of the graft copolymer, homopolymer of PAN, and homopolymer of PVA on mass basis.

The PAN amount in the graft copolymer (mass of PAN formed in the copolymerization) is a total amount of PAN grafted onto PVA and PAN homopolymer, and can be calculated from the polymerization rate of acrylonitrile and mass of acrylonitrile charged.

Specifically, mass % of PAN in the graft copolymer can be obtained by Formula (2).

$$\text{Mass \% of PAN in the graft copolymer} = d \times 0.01 \times e/(f + d \times 0.01 \times e) \times 100 \text{ (mass \%)} \quad (2)$$

In Formula (2), d represents the polymerization rate (%) of acrylonitrile, e represents mass (charge-in amount) of acrylonitrile used for the graft copolymerization, and f represents mass (charge-in amount) of PVA used for the graft copolymerization. The polymerization rate d (%) of acrylonitrile can be obtained by Formula (3).

$$\text{Polymerization rate (\%) of acrylonitrile} = (g-f)/e \times 100(\%) \quad (3)$$

In Formula (3), g represents the mass of the composition containing the polymerized graft copolymer.

Also, by determining the ratio of this mass of PAN to the charged-in mass of PVA, the mass ratio (composition ratio) of PVA to PAN in the graft copolymer can be calculated. The ratio (composition ratio) of the PVA amount to the PAN amount in the graft copolymer is preferably 10:90 to 40:60 in view of oxidation resistance.

The content of the graft copolymer in the dispersant is preferably 50 mass % or more, and more preferably 90 mass % or more, from the viewpoint of enhancing dispersibility.

The method of producing the graft copolymer (graft copolymerization reactant) is not particularly limited, but a method is preferable in which after preparing polyvinyl acetate, the polyvinyl acetate is saponified to obtain PVA, and a monomer containing acrylonitrile as a main component is grafted onto the PVA.

As a method of preparing polyvinyl acetate, any known method, such as bulk polymerization and solution polymerization, may be used. Examples of an initiator used in the preparation of polyvinyl acetate include azoic initiators such as azobisisobutyronitrile, and organic peroxides such as benzoyl peroxide, bis(4-t-butyrcyclohexyl) peroxydicarbonate.

The saponification reaction of polyvinyl acetate may be conducted by, for instance, saponification in an organic solvent in the presence of a saponification catalyst. Examples of the organic solvent include methanol, ethanol, propanol, ethylene glycol, methyl acetate, ethyl acetate, acetone, methyl ethyl ketone, benzene, toluene, etc. These may be used alone or in combinations of two or more. Of these, methanol is preferred. Examples of the saponification catalyst include basic catalysts such as sodium hydroxide, potassium hydroxide, and sodium alkoxide, and acidic catalysts such as sulfuric acid and hydrochloric acid. Of these, sodium hydroxide is preferred in view of the saponification rate.

A method of a graft copolymerization in which a monomer containing acrylonitrile as a main component is grafted onto polyvinyl alcohol may be carried out by a solution polymerization. Examples of the solvent to be used include dimethyl sulfoxide and N-methylpyrrolidone.

Examples of the initiator to be used in graft copolymerization include organic peroxides such as benzoyl peroxide; azo compounds such as azobisisobutyronitrile; potassium peroxodisulphate; and ammonium peroxodisulphate.

The graft copolymer prepared as in the above may be used by dissolving in a solvent. Examples of the solvent include dimethyl sulfoxide, and N-methylpyrrolidone.

<Conductive Agent>

The conductive agent used is preferably at least one selected from the group consisting of (i) fibrous carbon, (ii) spherical carbon, and (iii) a carbon composite in which fibrous carbon and spherical carbon are interconnected. Examples of the fibrous carbon include a vapor-grown carbon fiber, a carbon nanotube, and a carbon nanofiber. Examples of the spherical carbon include carbon black. Examples of the carbon black include acetylene black, furnace black, and Ketjenblack (registered trademark). These conductive agents may be used alone or in combinations of two or more. Of these, it is most preferable to use one or more selected from the group consisting of acetylene black, carbon nanotube, and carbon nanofiber in view of the high effect of improving the dispersibility of the conductive agent.

The size of the conductive agent is not particularly limited, but in the case of a fibrous carbon, the average length of a primary particle may be about 0.5 μm to 3.0 μm, and in the case of a spherical carbon, the number-average primary particle diameter may be about 10 nm to 50 nm. The average length is an average value of lengths of several tens of fiber fragments. The number-average primary particle diameter is an average value of diameters of several thousands of primary particles.

The content of the conductive agent in the conductive resin composition for electrodes is preferably 0.5 mass % to 1.5 mass %. Within this range, an electrode excellent in dispersibility can be prepared.

<Binding Material>

Examples of the binding material include polyvinylidene fluoride (PVdF), polytetrafluoroethylene, styrene/butadiene copolymer, and (meth)acrylate ester copolymer. There is no limitation in the polymer structure as a binding material, and a random copolymer, alternating copolymer, graft copolymer, block copolymer, etc., may be used. Of these, PVdF is preferred in view of oxidation resistance.

The content of the binding material in the conductive resin composition for electrodes is preferably 1.0 mass % to 3.0 mass %. Within this range, an electrode excellent in binding capacity and low resistance can be prepared.

<Conductive Resin Composition for Electrodes>

The conductive resin composition for electrodes can be produced by using a known method. For instance, the composition can be obtained by mixing a solvent dispersion solution of a conductive agent, binding material, and a graft copolymer by using a ball mill, sand mill, biaxial kneader, rotational and revolutional agitator, planetary mixer, dispermixer, etc., and the composition is generally used as a slurry. As the above-described conductive agent, binding material, and graft copolymer, those already mentioned may be used. Examples of a dispersion medium for the conductive resin composition for electrodes include water, N-methylpyrrolidone, cyclohexane, methyl ethyl ketone, and methyl isobutyl ketone. When polyvinylidene fluoride is used as a polymer binding material, N-methylpyrrolidone is preferred in view of solubility, and when a styrene/butadiene copolymer is used, water is preferred.

The solid content in the conductive resin composition for electrodes is not particularly limited, but 10 mass % to 90 mass % is more preferred, and 10 mass % to 20 mass % is most preferred. By setting the solid content in the conductive resin composition for electrodes at 10 mass % to 50 mass %, the viscosity of the conductive resin composition for electrodes is increased, the force for crushing the conductive agent is increased, and a higher conductive agent dispersing effect is easier to obtain. By setting the solid content at 10 mass % to 20 mass %, flowability of the conductive resin composition for electrodes is enhanced, and stability over time of the conductive resin composition for electrodes is increased.

The mass ratio of the dispersant to the conductive agent (mass of the dispersant/mass of the conductive agent) in the conductive resin composition for electrodes is preferably 0.01 to 1, more preferably 0.01 to 0.5, and most preferably 0.01 to 0.1. By setting the mass ratio of the dispersant to the conductive agent in the conductive resin composition for electrodes at 0.01 to 1, the graft copolymer in the dispersant adsorbs to the conductive agent, and a higher dispersing effect is easier to obtain. By setting the mass ratio at 0.01 to 0.1, in addition to the higher dispersing effect, an effect wherein excess graft copolymers cover the surface of the conductive agent and inhibit the charge transfer reaction is suppressed and the high resistance of the battery is suppressed.

[Electrode Composition]

The electrode composition of the present embodiment contains the conductive resin composition for electrodes and an active material. The material for the conductive resin composition for electrodes is as mentioned above, and so is not described here. The content of the conductive resin composition for electrodes is preferably 10 mass % or more, or 20 mass % or more in the electrode composition, in view of dispersibility and high output.

<Active Material>

The active material is a lithium-containing composite oxide or a lithium-containing polyanion compound containing Mn and having a volume resistivity of $1 \times 10^4$ Ω·cm or higher, and is a positive electrode active material capable of reversibly occluding and releasing cations. Examples thereof include $LiCoO_2$, $LiMn_2O_4$, $LiNiO_2$, $LiMPO_4$, $Li_2MSiO_4$, $LiNi_xM_{n(2-x)}O_4$, $Li(Mn_xNi_yCo_z)O_2$, $Li(Al_xNi_yCo_z)O_2$, and $xLi_2MnO_3\text{-}(1-x)LiMO_2$.

Herein X in $LiNi_xM_{n(2-x)}O_4$ satisfies the relation $0<X<2$, X, Y, and Z in $Li(Mn_xNi_yCo_z)O_2$ and $Li(Al_xNi_yCo_z)O_2$ satisfy the relation $X+Y+Z=1$, and each satisfies the relation $0<X<1$, $0<Y<1$, and $0<Z<1$, x in $xLi_2MnO_3\text{-}(1-x)LiMO_2$ satisfies the relation $0<x<1$, and M in $LiMPO_4$, $Li_2MSiO_4$, and $xLi_2MnO_3\text{-}(1-x)LiMO_2$ is preferably at least one element selected from Fe, Co, Ni, and Mn. Herein, X, Y, and Z are all natural numbers.

Of the above active materials, the active material used in the present invention preferably has an average particle diameter (D50) measured by a laser light scattering method of 20 μm or less, and more preferably 5 μm or less. With this constitution, the effect of reducing the viscosity of the electrode composition is sufficiently exerted, and electrodes having improved dispersibility of a conductive agent and a lithium ion battery having high cyclability are more easily obtained.

The electrode composition can be produced by using a known method. For instance, the composition may be obtained through a method in which a solvent dispersion solution of the conductive resin composition for electrodes and the active material are mixed by using a ball mill, sand mill, biaxial kneader, rotational and revolutional agitator, planetary mixer, dispermixer, etc., and the composition is generally used as slurry. As the conductive resin composition for electrodes described above, those already described may be used. Examples of the dispersion medium of the electrode composition include water, N-methylpyrrolidone, cyclohexane, methyl ethyl ketone, and methyl isobutyl ketone. When polyvinylidene fluoride is used as a polymer binding material, N-methylpyrrolidone is preferred in view of solubility, and when a styrene/butadiene copolymer is used, water is preferred. The slurry of the electrode composition produced is preferably subjected to vacuum defoaming at a stage before application so as to suppress occurrence of defects and maintain smoothness thereof. If bubbles are present in the slurry of the electrode composition, when the slurry is applied on an electrode, defects occur in the coating, which can damage the smoothness.

[Electrode]

The electrode of the present embodiment has a layer comprising the above electrode composition on metal foil. This electrode forms a composite electrode material layer which is a porous material obtained through a process in which the above slurry of the electrode composition is applied onto a collector such as aluminum foil, and then the solvent contained in the slurry is removed by heating, and the active material is bound onto the surface of the collector via a binding material. The target electrode can be obtained by pressing the collector and the composite electrode material layer with roll press, etc., and closely adhering to each other.

[Lithium Ion Battery]

Figure 01:
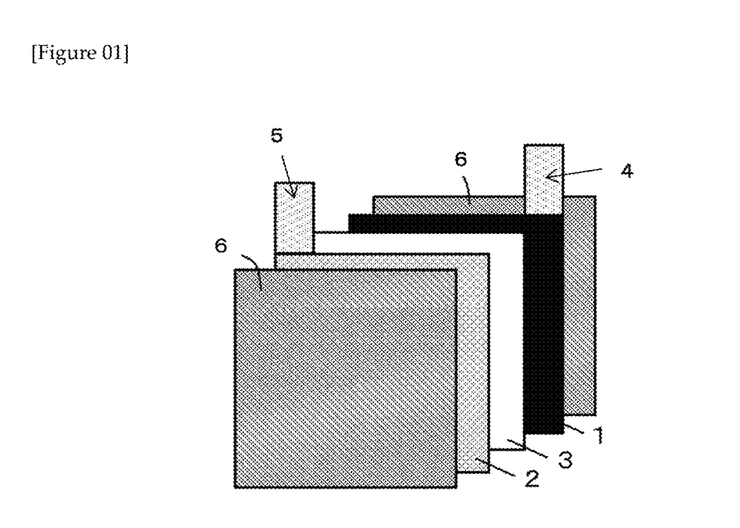

The lithium ion battery of the present embodiment is a lithium ion battery using the electrode as a positive electrode. The method of preparing the lithium ion battery is not particularly limited, and a conventionally known method of preparing a secondary battery may be used. For instance, the battery may be prepared in the constitution schematically shown in FIG. 1 according to the following method: an aluminum tab 4 is welded to a positive electrode 1 which uses the above electrode, and a nickel tab 5 is welded to a negative electrode 2, and then a polyolefin microporous membrane 3 serving as an insulating layer is disposed between the electrodes, a nonaqueous electrolyte is poured into the space part of the positive electrode 1, the negative electrode 2, and the polyolefin microporous membrane 3 until the electrolyte sufficiently soaks thereinto, followed by sealing with an exterior 6.

Use of the lithium ion battery is not particularly limited, and the battery may be used in a wide variety of fields, including portable AV equipment, such as digital cameras, video cameras, portable audio players, and portable liquid crystal televisions; portable information terminal devices, such as note-type personal computers, smart phones, mobile PCs; and further, portable game machines, electric tools, electromotive bicycles, hybrid vehicles, electric vehicles, and power storage systems.

EXAMPLES

Hereinafter, Examples and Comparative Examples will be illustrated in order to describe the present invention more specifically. However, the present invention shall not be limited to Examples shown below as long as the spirit thereof is not impaired. In addition, components used in both Examples and Comparative Examples were dried in a vacuum at 170° C. for 3 hours in order to evaporate the adsorbed moisture.

<Preparation of Polyvinyl Alcohol (PVA)>

600 parts by mass of vinyl acetate and 400 parts by mass of methanol were charged, nitrogen gas was bubbled for deoxygenation, and 0.3 parts by mass of bis(4-t-butylcyclohexyl) peroxydicarbonate was then charged as a polymerization initiator, and the mixture was polymerized at 60° C. for 4 hours. The concentration of solids in the polymerization solution was 48% when the polymerization was stopped, and the polymerization rate of vinyl acetate calculated from the solids was 80%. Methanol vapor was blown into the obtained polymerized solution to remove unreacted vinyl acetate, and the solution was then diluted with methanol so that the concentration of polyvinyl acetate was 40 mass %.

Into 1,200 parts by mass of the diluted polyvinyl acetate solution, 20 parts by mass of a 10 mass % solution of sodium hydroxide in methanol was added, and a saponification reaction was performed at 30° C. for 2 hours.

The solution after the saponification reaction was neutralized with acetic acid, filtered, and dried at 100° C. for 2 hours to obtain PVA. The average degree of polymerization of the obtained PVA was 330, and the degree of saponification thereof was 96.3 mol %.

<Polymerization Degree and Degree of Saponification>

The average degree of polymerization and degree of saponification of PVA were measured via a method in accordance with JIS K 6726.

<Synthesis of Graft Copolymer A>

Into 265.1 parts by mass of dimethylsulfoxide, 1.65 parts by mass of the obtained PVA was added, and was dissolved therein by stirring at 60° C. for 2 hours. Furthermore, 30.3 parts by mass of acrylonitrile and 0.03 parts by mass of ammonium peroxodisulfate dissolved in 3 parts by mass of dimethylsulfoxide were added at 60° C., and the mixture was graft-copolymerized while stirring at 60° C. The polymerization was stopped by cooling the mixture to room temperature four hours after the start of the polymerization. Into 2,970 parts by mass of methanol, 297 parts by mass of the reaction solution including the obtained graft copolymer A was added dropwise, and the graft copolymer A was precipitated. The polymer was separated by filtration, dried in vacuum at room temperature for 2 hours, and further dried in vacuum at 80° C. for 2 hours. The solids in the composition containing the obtained graft copolymer were 8.87 parts by mass, and by using Formula (3), the polymerization rate of acrylonitrile was calculated from the solids to be 23.8%.

The mass of PAN in the obtained graft copolymer A was 81.4 mass % based on the whole polymer, the graft ratio was 438%, and the mass average molecular weight of the PAN homopolymer was 256,200. The graft ratio was calculated by using Formula (1) described above.

<Composition Ratio>

The polyvinyl alcohol content and the polyacrylonitrile content in graft copolymer A (the composition ratio) were calculated from the reaction rate (polymerization rate) of acrylonitrile and the composition of the charge-in amounts of the respective components used for the polymerization. The mass % of PAN produced during copolymerization (mass % of PAN in the graft copolymer) was calculated by using Formula (2) described above from the polymerization rate (%) of acrylonitrile, the mass of acrylonitrile used for the graft copolymerization (charge-in amount), and the mass of PVA used for the graft copolymerization (charge-in amount). The mass ratio of PVA to PAN in graft copolymer A was 18.6:81.4. The polyvinyl alcohol content and the polyacrylonitrile content in the table below are the respective masses in the resin content including the graft copolymer itself, as well as the PVA homopolymer and the PAN homopolymer that are produced during copolymerization.

<Synthesis of Graft Copolymer B>

The amount of bis(4-t-butylcyclohexyl) peroxydicarbonate in graft copolymer A was changed to 0.15 parts by mass, and polymerization was performed at 60° C. for 5 hours. The polymerization rate was 80%. After removing unreacted vinyl acetate in the same way as for graft copolymer A, the solution was diluted with methanol so that the concentration of polyvinyl acetate was 30 mass %. Into 2,000 parts by mass of this polyvinyl acetate solution, 20 parts by mass of a 10 mass % solution of sodium hydroxide in methanol was added, and a saponification reaction was performed at 30° C. for 2.5 hours.

Neutralization, filtration and drying were performed in the same way as for graft copolymer A to obtain PVA with an average degree of polymerization of 1,650 and a degree of saponification of 95.5 mol %.

Using the obtained PVA, graft copolymerization with PAN was performed in the same way as for graft copolymer A, and graft copolymer B was prepared. The mass ratio of PVA to PAN in graft copolymer B was 19:81. This composition ratio was measured via the same method as for graft copolymer A. The same also applies to the following graft copolymers C to G.

<Synthesis of Graft Copolymer C>

The amount of vinyl acetate in graft copolymer A was changed to 900 parts by mass, the amount of the polymerization initiator, bis(4-t-butylcyclohexyl) peroxydicarbonate was changed to 0.15 parts by mass, and polymerization was performed at 60° C. for 5 hours. The polymerization rate was 70%. The solution was diluted with methanol so that the concentration of polyvinyl acetate was 30 mass %. Into 2,000 parts by mass of this polyvinyl acetate solution, 20 parts by mass of a 10 mass % solution of sodium hydroxide in methanol was added, and a saponification reaction was performed at 30° C. for 2.5 hours. Neutralization, filtration and drying were performed in the same way as for graft copolymer A to obtain PVA with an average degree of polymerization of 2,940 and a degree of saponification of 94.8 mol %.

Using the obtained PVA, graft copolymerization with PAN was performed in the same way as for graft copolymer A, and graft copolymer C was prepared. The mass ratio of PVA to PAN in the obtained graft copolymer C was 21:79.

<Synthesis of Graft Copolymer D>

The same operation as that for graft copolymer A was performed except that, during polymerization of polyvinyl acetate in graft copolymer A, the charge-in amounts of vinyl acetate, methanol and bis(4-t-butylcyclohexyl) peroxydicarbonate were changed to 500 parts by mass, 500 parts by mass and 0.3 parts by mass, respectively, thereby obtaining PVA with an average degree of polymerization of 290 and a degree of saponification of 91 mol %.

Using the obtained PVA, graft copolymerization with PAN was performed in the same way as for graft copolymer A, and graft copolymer D was prepared. The preparation of graft copolymer D was performed in the same way as for graft copolymer A except that the parts by mass of PVA in graft copolymer A was changed to 3.2. The mass ratio of PVA to PAN in the obtained graft copolymer D was 42:58.

<Synthesis of Graft Copolymer E>

The same operation as that for graft copolymer A was performed except that, during polymerization of polyvinyl acetate in graft copolymer A, the charge-in amounts of vinyl acetate, methanol and bis(4-t-butylcyclohexyl) peroxydicarbonate were changed to 3,000 parts by mass, 500 parts by mass and 0.15 parts by mass, respectively, and also the reaction time and the saponification time were changed to 12 hours and 2 hours, respectively, thereby obtaining PVA with an average degree of polymerization of 3,640 and a degree of saponification of 93 mol %.

Using the obtained PVA, graft copolymerization with PAN was performed in the same way as for graft copolymer A, and graft copolymer E was prepared. The preparation of graft copolymer E was performed in the same way as for graft copolymer A except that the parts by mass of PVA in graft copolymer A was changed to 3.2. The mass ratio of PVA to PAN in the obtained graft copolymer E was 45:55.

<Synthesis of Graft Copolymer F>

The same operation as that for graft copolymer A was performed except that, during polymerization of polyvinyl acetate in graft copolymer A, the charge-in amount of vinyl acetate was changed to 1,800 parts by mass, and also the reaction time and the saponification time were changed to 12 hours and 0.5 hours, respectively, thereby obtaining PVA with an average degree of polymerization of 1,710 and a degree of saponification of 63 mol %.

Using the obtained PVA, polymerization of PAN was performed in the same way as for graft copolymer A, and graft copolymer F was prepared. The preparation of graft copolymer F was performed in the same way as for graft copolymer A except that the parts by mass of PVA in graft copolymer A was changed to 6.5. The mass ratio of PVA to PAN in the obtained graft copolymer F was 86:14.

<Synthesis of Graft Copolymer G>

The same operation as for graft copolymer A was performed except that, during polymerization of polyvinyl acetate in graft copolymer A, the charge-in amounts of vinyl acetate and bis(4-t-butylcyclohexyl) peroxydicarbonate were changed to 3,000 parts by mass and 0.15 parts by mass, respectively, and also the reaction time and the saponification time were changed to 12 hours and 2 hours, respectively, thereby obtaining PVA with an average degree of polymerization of 3,380 and a degree of saponification of 93 mol %.

Using the obtained PVA, polymerization of PAN was performed in the same way as for graft copolymer A, and graft copolymer G was prepared. The preparation of graft copolymer G was performed in the same way as for graft copolymer A except that the parts by mass of PVA in graft copolymer A was changed to 3.7. The mass ratio of PVA to PAN in the obtained graft copolymer G was 49:51.

<Synthesis of Graft Copolymer H>

The same operation as for graft copolymer A was performed except that, during polymerization of polyvinyl acetate in graft copolymer A, the charge-in amounts of vinyl acetate and bis(4-t-butylcyclohexyl) peroxydicarbonate were changed to 3,000 parts by mass and 0.13 parts by mass, respectively, and also the reaction time and the saponification time were changed to 12 hours and 2.5 hours, respectively, thereby obtaining PVA with an average degree of polymerization of 3,350 and a degree of saponification of 89 mol %.

Using the obtained PVA, polymerization of PAN was performed in the same way as for graft copolymer A, and graft copolymer H was prepared. The preparation of graft copolymer H was performed in the same way as for graft copolymer A except that the parts by mass of PVA in graft copolymer A was changed to 2.3. The mass ratio of PVA to PAN in the obtained graft copolymer H was 39:61.

<Synthesis of Graft Copolymer I>

The same operation as for graft copolymer A was performed except that, during polymerization of polyvinyl acetate in graft copolymer A, the charge-in amounts of vinyl acetate and bis(4-t-butylcyclohexyl) peroxydicarbonate were changed to 2,000 parts by mass and 0.15 parts by mass, respectively, and also the reaction time and the saponification time were changed to 12 hours and 0.5 hours, respectively, thereby obtaining PVA with an average degree of polymerization of 1,950 and a degree of saponification of 75 mol %.

Using the obtained PVA, polymerization of PAN was performed in the same way as for graft copolymer A, and graft copolymer I was prepared. The preparation of graft copolymer I was performed in the same way as for graft copolymer A except that the parts by mass of PVA in graft copolymer A was changed to 2.0. The mass ratio of PVA to PAN in the obtained graft copolymer H was 35:65.

Properties of the graft copolymers used in Examples and Comparative Examples are shown in Table 1.

TABLE 1

| Graft copolymer | A | B | C | D | E | F | G | H | I |
|---|---|---|---|---|---|---|---|---|---|
| Average degree of polymerization of polyvinyl alcohol | 330 | 1650 | 2940 | 290 | 3640 | 1710 | 3380 | 3350 | 1950 |
| Degree of saponification of polyvinyl alcohol [mol %] | 96.3 | 95.5 | 94.8 | 91 | 93 | 63 | 93 | 89 | 75 |
| Polyvinyl alcohol content [mass %] | 18.6 | 19 | 21 | 42 | 45 | 86 | 49 | 39 | 35 |
| Polyacrylonitrile content [mass %] | 81.4 | 81.0 | 79.0 | 58.0 | 55.0 | 14 | 51 | 61 | 65 |

Example 1

(Preparation of Conductive Resin Composition for Electrodes)

N-Methylpyrrolidone (manufactured by Kanto Chemical Co., Inc.; hereinafter described as "NMP"), polyvinylidene fluoride (manufactured by Arkema K.K.; "HSV900," hereinafter described as "PVdF"), carbon black (manufactured by Denka Company Limited; "Li-435," hereinafter described as "Li-435") and graft copolymer A described above were provided as a solvent, a binding material, a conductive agent, and a dispersant, respectively. PVdF, Li-435, and graft copolymer A were weighed and mixed so that PVdF accounts for 47.6 mass % in solids, Li-435 accounts for 47.6 mass % in solids, and graft copolymer A accounts for 4.76 mass % in solids (mass of the dispersant/ mass of the conductive agent=0.1), and to this mixture, NMP was added so that the solid content was 15 mass %. Then, using a planetary centrifugal mixer (manufactured by Thinky Corporation; Thinky Mixer (Vacuum type) ARV-310), the components were mixed until becoming homogeneous to obtain a conductive resin composition for electrodes.

[Evaluation of Dispersibility (Coarse Grain in Conductive Resin Composition for Electrodes)]

For the dispersibility of the conductive resin composition for electrodes, an evaluation on coarse grain was conducted according to a method of using a grind gauge described in JIS K5600-2-5. Specifically, the conductive resin composition for electrodes was applied with a scraper on the surface of a sample, and the scale at which three or more continuous, line-shaped marks with the length of 10 mm or longer were formed side by side per groove was measured. A lower value of the grind gauge means a good dispersibility. The grind gauge of the present example was 5 μm.

[Evaluation of Dispersibility (Viscosity of Conductive Resin Composition for Electrodes)]

For the dispersibility of the conductive resin composition for electrodes, an evaluation on viscosity was conducted according to a method of using a rotational rheometer described in JIS K7244-10. Specifically, using a rotational rheometer (manufactured by Anton Paar GmbH; MCR300), 1 g of the conductive resin composition for electrodes with a solid content of 15 mass % was applied onto a disk, measurement was performed while varying the shear velocity from 100 $s^{-1}$ to 0.01 $s^{-1}$, and the viscosity at the shear velocity of 1 $s^{-1}$ was evaluated. A lower value of the viscosity means a good dispersibility. The viscosity of the present example was 5.8 Pa·s.

[Evaluation of Oxidation Resistance (Oxidative Degradation Electric Current Value)]

The conductive resin composition for electrodes was applied onto an aluminum foil such that the thickness after drying was 20 μm, and was dried at 105° C. for 1 hour to obtain a test piece.

By using the obtained test piece as a working electrode, lithium as the counter electrode and the reference electrode, and a solution (concentration 1 mol/L) of $LiPF_6$, an electrolyte salt, in ethylene carbonate/diethyl carbonate (=1/2 (volume ratio)) as the electrolyte, a 3-electrode cell (manufactured by Toyo System Co., LTD.) was assembled. An electrochemical measuring system (manufactured by Solartron Corporation Ltd.; function generator 1260 and potentio-galvanostat 1287) was used to perform cyclic voltammetry (hereinafter, abbreviated as "CV") within a range from 2.5 V to 5.0 V at 25° C. with a scanning speed of 10 mV/sec. The electric current value at 5.0 V was defined as the oxidative degradation electric current value. As the oxidative degradation electric current value lowers, it is deemed that oxidative degradation is unlikely and the oxidation resistance is high. The oxidative degradation electric current value of the present example was 0.05 $mA/cm^2$.

(Preparation of Electrode Composition)

The prepared conductive resin composition for electrodes, and $LiCoO_2$ (manufactured by Umicore S.A.; "KD20," average primary particle diameter 15 μm) as an active material were provided. $LiCoO_2$ and the conductive resin composition for electrodes were weighed and mixed so that $LiCoO_2$ accounts for 98 mass % in solids and the composition accounts for 2 mass % in solids, and to this mixture, NMP was added so that the solid content was 72 mass %. Then, using a planetary centrifugal mixer (manufactured by Thinky Corporation; Thinky Mixer (Vacuum type) ARV-310), the components were mixed until becoming homogeneous to obtain an electrode composition.

[Evaluation of Dispersibility (Viscosity of Electrode Composition)]

For the dispersibility of the electrode composition, evaluation on viscosity was conducted according to a method of using a rotational rheometer described in JIS K7244-10. Specifically, using a rotational rheometer (manufactured by Anton Paar GmbH, MCR300), 1 g of the electrode composition with a solid content of 72 mass % was applied onto a disk, measurement was performed while varying the shear velocity from 100 $s^{-1}$ to 0.01 $s^{-1}$, and the viscosity at the shear velocity of 1 $s^{-1}$ was evaluated. A lower value of the viscosity means a good dispersibility. The viscosity of the present example was 12.5 Pa·s.

(Production of Electrode)

Figure 02:
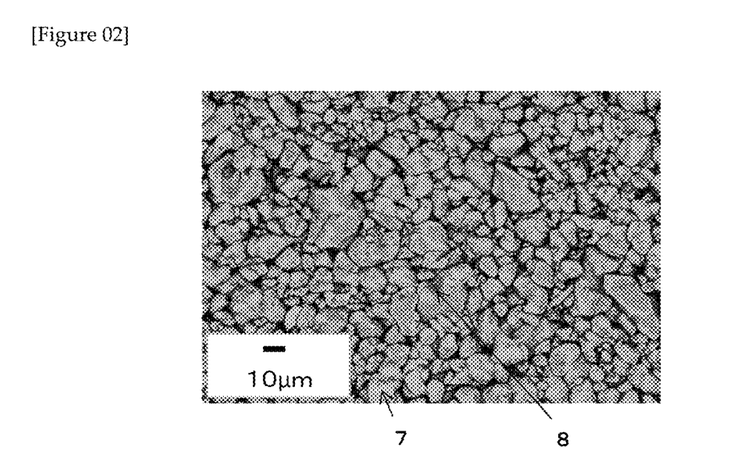

The prepared electrode composition was deposited onto an aluminum foil with the thickness of 15 μm (manufactured by UACJ Corporation) with an applicator, and left to stand for predrying in a dryer at 105° C. for 1 hour. Next, pressing was performed in a roll pressing machine with a linear pressure of 200 kg/cm, and the film was prepared so that the thickness thereof including the 15 μm-thick aluminum foil was 60 μm. In order to remove volatile components, vacuum drying was performed at 170° C. for 3 hours to obtain an electrode. FIG. 2 shows a scanning electron microscope image of the electrode. The conductive agent 8 and the active material 7 are distributed evenly, thereby achieving a high dispersibility.

[Evaluation of Electrode Plate Resistance of Electrode]

The produced electrode was cut into a disk shape with a diameter of 14 mm, and the two sides were sandwiched with plate electrodes made of SUS304. In this condition, an electrochemical measuring system (manufactured by Solartron Corporation Ltd.; function generator 1260 and potentiogalvanostat 1287) was used to measure the AC impedance at an amplitude voltage of 10 mV and in a frequency range of 1 Hz to 100 kHz. The resistance value calculated by multiplying the obtained resistance component value by the area of the cut-out disk was defined as the electrode plate resistance. The electrode plate resistance of the electrode of the present example was 240 Ω·cm².

(Production of Negative Electrode)

Pure water (manufactured by Kanto Chemical Co., Inc.) as the solvent, artificial graphite (manufactured by Hitachi Chemical Co., Ltd.; "MAG-D") as the negative electrode active material, styrene-butadiene rubber (manufactured by Zeon Corporation; "BM-400B," hereinafter described as "SBR") as the binding material, and carboxymethyl cellulose (manufactured by Daicel Corporation; "D2200," hereinafter described as "CMC") as the dispersant were provided. Next, CMC and the artificial graphite were weighed and mixed so that CMC accounts for 1 mass % in solids and the artificial graphite accounts for 97 mass % in solids, and to this mixture, the pure water was added. Then, using a planetary centrifugal mixer (manufactured by Thinky Corporation, Thinky Mixer (Vacuum type) ARV-310), the components were mixed until becoming homogeneous. Furthermore, SBR was weighed so that SBR accounts for 2 mass % in solids, and was mixed into the mixture described above. Then, using the planetary centrifugal mixer described above, the components were mixed until becoming homogeneous to obtain a negative electrode slurry for non-aqueous batteries. Next, the negative electrode slurry for non-aqueous batteries was deposited onto a copper foil with a thickness of 10 μm (manufactured by UACJ Corporation) with an applicator, and left to stand for predrying in a dryer at 60° C. for 1 hour. Then, pressing was performed in a roll pressing machine with a linear pressure of 100 kg/cm, and the film was prepared such that the thickness thereof including the copper foil was 40 μm. In order to completely remove residual water, vacuum drying was performed at 120° C. for 3 hours to obtain a negative electrode.

(Production of Lithium Ion Battery)

In a dry room that was controlled such that the dew point was −50° C. or lower, the electrode described above was processed to a size of 40 mm×40 mm, and the negative electrode was processed to a size of 44 mm×44 mm. Then, both were placed such that the surfaces onto which the composite electrode materials were applied faced each other at the center, and furthermore, a polyolefin microporous membrane processed to a size of 45 mm×45 mm was placed between these electrodes. Next, an aluminum laminate sheet that had been cut and processed into a rectangle of 70 mm by 140 mm was folded in two at the central parts of the long sides, and the laminate sheet was placed to sandwich the electrodes such that the current collection tabs thereof were exposed outside of the laminate sheet. Subsequently, two sides of the aluminum laminate sheet, including the side from which the current collection tabs were exposed, were heat fused with a heat sealer. Then, from the side that was not heat fused, 2 g of an electrolyte (manufactured by Kishida Chemical Co., Ltd.; a solution of ethylene carbonate/diethyl carbonate=1/2 (volume ratio)+1M $LiPF_6$, hereinafter described as the "electrolyte") was injected and was allowed to sufficiently permeate into the positive electrode employing the electrode described above, the negative electrode, and the polyolefin microporous membrane. After that, the remaining side of the aluminum laminate sheet was heat fused while reducing the pressure inside the battery with a vacuum heat sealer to obtain a lithium ion battery.

(Evaluation of Lithium Ion Battery)

For the produced lithium ion battery, the battery performances were evaluated via the following methods.

[Discharge Rate Property (Capacity Retention Rate Upon 3 C Discharge)]

The produced lithium ion battery was charged at 25° C. with a constant voltage and a constant current with the limitation of 4.45 V and 0.2 C, and then discharged to 3.0 V with a constant current of 0.2 C. Next, the discharge current was changed to 0.2 C, 0.5 C, 1 C, 2 C and 3 C, and the discharge capacity for each of the discharge currents was measured. For the recovery charge conducted between each measurement, constant current and constant voltage charge was performed with the limitation of 4.45 V and 0.2 C. Then, the capacity retention rate upon 3 C discharge against 0.2 C discharge was calculated. The capacity retention rate upon 3 C discharge of the lithium ion battery of the present example was 82.5%.

[Cyclability (Discharge Capacity Retention Rate after Cycle)]

The produced lithium ion battery was charged at 25° C. with a constant current and a constant voltage with the limitation of 4.45 V and 1 C, and then discharged to 3.0 V with a constant current of 1 C. Next, 400 cycles of the charge and discharge described above were repeated, and the discharge capacity was measure. Then, the discharge capacity retention rate after cycle upon 400 cycles of discharge against 1 cycle of discharge was calculated. The discharge capacity retention rate after cycle of the lithium ion battery of the present example was 90%.

Example 2

A conductive resin composition for electrodes, an electrode composition, an electrode and a lithium ion battery were produced via the same method as Example 1 except that the dispersant of Example 1 was changed to graft copolymer B, and each evaluation was performed. Results are shown in Table 2.

Example 3

A conductive resin composition for electrodes, an electrode composition, an electrode and a lithium ion battery were produced via the same method as Example 1 except that the dispersant of Example 1 was changed to graft copolymer C, and each evaluation was performed. Results are shown in Table 2.

Example 4

A conductive resin composition for electrodes, an electrode composition, an electrode and a lithium ion battery were produced via the same method as Example 1 except that, differently from Example 1, PVdF, Li-435 and graft copolymer A were weighed and mixed so that PVdF accounts for 49.75 mass % in solids, Li-435 accounts for 49.75 mass % in solids, and graft copolymer A accounts for 0.498 mass % in solids (mass of the dispersant/mass of the conductive agent=0.01), and then each evaluation was performed. Results are shown in Table 2.

Example 5

A conductive resin composition for electrodes, an electrode composition, an electrode and a lithium ion battery were produced via the same method as Example 1 except that, differently from Example 1, PVdF, Li-435 and graft copolymer A were weighed and mixed so that PVdF accounts for 40.0 mass % in solids, Li-435 accounts for 40.0 mass % in solids, and graft copolymer A accounts for 20.0 mass % in solids (mass of the dispersant/mass of the conductive agent=0.5), and then each evaluation was performed. Results are shown in Table 3.

Example 6

A conductive resin composition for electrodes, an electrode composition, an electrode and a lithium ion battery were produced via the same method as Example 1 except that, differently from Example 1, PVdF, Li-435 and graft copolymer A were weighed and mixed so that PVdF accounts for 33.3 mass % in solids, Li-435 accounts for 33.3 mass % in solids, and graft copolymer A accounts for 33.3 mass % in solids (mass of the dispersant/mass of the conductive agent=1), and then each evaluation was performed. Results are shown in Table 3.

Example 7

A conductive resin composition for electrodes, an electrode composition, an electrode and a lithium ion battery were produced via the same method as Example 1 except that, differently from Example 1, PVdF, Li-435 and graft copolymer A were weighed and mixed so that PVdF accounts for 20.0 mass % in solids, Li-435 accounts for 20.0 mass % in solids, and graft copolymer A accounts for 60.0 mass % in solids (mass of the dispersant/mass of the conductive agent=3), and then each evaluation was performed. Results are shown in Table 3.

Example 8

A conductive resin composition for electrodes, an electrode composition, an electrode and a lithium ion battery were produced via the same method as Example 1 except that the conductive agent of Example 1 was changed to carbon nanotube (manufactured by CNano Technology Limited; Flotube9000, hereinafter described as "CNT"), and each evaluation was performed. Results are shown in Table 3.

Example 9

A conductive resin composition for electrodes, an electrode composition, an electrode and a lithium ion battery were produced via the same method as Example 1 except that, differently from Example 1, Li-435 and CNT were used in combination as the conductive agent and Li-435 and CNT were weighed and mixed so that Li-435 accounts for 23.8 mass % in solids and CNT accounts for 23.8 mass % in solids, and each evaluation was performed. Results are shown in Table 4.

Example 10

A conductive resin composition for electrodes, an electrode composition, an electrode and a lithium ion battery were produced via the same method as Example 1 except that the conductive agent of Example 1 was changed to carbon black Li-250 (manufactured by Denka Company Limited), and each evaluation was performed. Results are shown in Table 4.

Example 11

A conductive resin composition for electrodes, an electrode composition, an electrode and a lithium ion battery were produced via the same method as Example 1 except that the conductive agent of Example 1 was changed to Ketjen black (manufactured by Lion Specialty Chemicals Co., Ltd.; ECP), and each evaluation was performed. Results are shown in Table 4.

Comparative Example 1

A conductive resin composition for electrodes, an electrode composition, an electrode and a lithium ion battery were produced via the same method as Example 1 except that the dispersant of Example 1 was not added and PVdF and Li-435 were weighed and mixed so that PVdF accounts for 50.0 mass % in solids and Li-435 accounts for 50.0 mass % in solids, and each evaluation was performed. Results are shown in Table 4. When the conductive resin composition for electrodes used in Comparative Example 1 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 2

A conductive resin composition for electrodes, an electrode composition, an electrode and a lithium ion battery were produced via the same method as Example 1 except that the dispersant of Example 1 was changed to graft copolymer D, and each evaluation was performed. Results are shown in Table 5. When the conductive resin composition for electrodes used in Comparative Example 2 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 3

A conductive resin composition for electrodes, an electrode composition, an electrode and a lithium ion battery were produced via the same method as Example 1 except that the dispersant of Example 1 was changed to graft copolymer E, and each evaluation was performed. Results are shown in Table 5. When the conductive resin composition for electrodes used in Comparative Example 3 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 4

A conductive resin composition for electrodes, an electrode composition, an electrode and a lithium ion battery were produced via the same method as Example 1 except that the dispersant of Example 1 was changed to graft copolymer F, and each evaluation was performed. Results are shown in Table 5. When the conductive resin composition for electrodes used in Comparative Example 4 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 5

A conductive resin composition for electrodes, an electrode composition, an electrode and a lithium ion battery were produced via the same method as Example 1 except that the dispersant of Example 1 was changed to graft copolymer G, and each evaluation was performed. Results are shown in Table 5. When the conductive resin composition for electrodes used in Comparative Example 5 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 6

A conductive resin composition for electrodes, an electrode composition, an electrode and a lithium ion battery were produced via the same method as Example 1 except that the dispersant of Example 1 was changed to polyvinyl alcohol (manufactured by Kanto Chemical Co., Inc.; Mw 16,000, product number 18330), and each evaluation was performed. Results are shown in Table 6. When the conductive resin composition for electrodes used in Comparative Example 6 was employed, the dispersibility was improved, but a high oxidative degradation electric current value was shown.

Comparative Example 7

A conductive resin composition for electrodes, an electrode composition, an electrode and a lithium ion battery were produced via the same method as Example 1 except that the dispersant of Example 1 was changed to polyacrylonitrile (manufactured by Sigma-Aldrich Co. LLC.; Mw 150,000, product number 181315), and each evaluation was performed. Results are shown in Table 6. When the conductive resin composition for electrodes used in Comparative Example 7 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 8

A conductive resin composition for electrodes, an electrode composition, an electrode and a lithium ion battery were produced via the same method as Example 1 except that the dispersant of Example 1 was changed to combined use of polyvinyl alcohol (manufactured by Kanto Chemical Co., Inc.; Mw 16,000, product number 18330) and polyacrylonitrile (manufactured by Sigma-Aldrich Co. LLC.; Mw 150,000, product number 181315), and each evaluation was performed. Results are shown in Table 6. When the conductive resin composition for electrodes used in Comparative Example 8 was employed, the dispersibility was poor, the viscosity was high, a high oxidative degradation electric current value was shown, and a high value of the electrode plate resistance was also shown. Furthermore, a low discharge capacity retention rate upon 3 C discharge was shown in the result of the battery evaluation.

Comparative Example 9

A conductive resin composition for electrodes, an electrode composition, an electrode and a lithium ion battery were produced via the same method as Example 1 except that the dispersant of Example 1 was changed to polyvinylpyrrolidone (manufactured by DKS Co. Ltd.; K-90), and each evaluation was performed. Results are shown in Table 6. When the conductive resin composition for electrodes used in Comparative Example 9 was employed, the dispersibility was improved, but a high oxidative degradation electric current value was shown.

Comparative Example 10

A conductive resin composition for electrodes, an electrode composition, an electrode and a lithium ion battery were produced via the same method as Example 1 except that the dispersant of Example 1 was changed to polyoxyethylene alkyl ether (manufactured by Lion Specialty Chemicals Co., Ltd.; LEOCOL TD-50), and each evaluation was performed. Results are shown in Table 7. When the conductive resin composition for electrodes used in Comparative Example 10 was employed, the dispersibility was improved, but a high oxidative degradation electric current value was shown.

Comparative Example 11

A conductive resin composition for electrodes, an electrode composition, an electrode and a lithium ion battery were produced via the same method as Example 1 except that the dispersant of Example 1 was changed to combined use of polyvinylpyrrolidone (manufactured by DKS Co. Ltd.) and polyoxyethylene alkyl ether (manufactured by Lion Specialty Chemicals Co., Ltd.), and each evaluation was performed. Results are shown in Table 7. When the conductive resin composition for electrodes used in Comparative Example 11 was employed, the dispersibility was improved, but a high oxidative degradation electric current value was shown.

Comparative Example 12

A conductive resin composition for electrodes, an electrode composition, an electrode and a lithium ion battery were produced via the same method as Example 1 except that the binding material of Example 1 was not added and graft copolymer A and Li-435 were weighed and mixed such that graft copolymer A accounts for 50.0 mass % in solids (mass of the dispersant/mass of the conductive agent=1) and Li-435 accounts for 50.0 mass % in solids, and each evaluation was performed. Results are shown in Table 7. When the conductive resin composition for electrodes used in Comparative Example 12 was employed, the dispersibility was improved and a low oxidative degradation electric current value was shown, but the electrode plate resistance was high, and furthermore, a low discharge capacity retention rate upon 3 C discharge was shown in the result of the battery evaluation.

Comparative Example 13

A conductive resin composition for electrodes, an electrode composition, an electrode and a lithium ion battery were produced via the same method as Example 1 except that the dispersant of Example 1 was changed to graft copolymer H, and each evaluation was performed. Results are shown in Table 7. When the conductive resin composition for electrodes used in Comparative Example 13 was employed, the dispersibility was poor, the viscosity was high, and a high value of the electrode plate resistance was also shown. Furthermore, a low discharge capacity retention rate upon 3 C discharge was shown in the result of the battery evaluation.

Comparative Example 14

A conductive resin composition for electrodes, an electrode composition, an electrode and a lithium ion battery were produced via the same method as Example 1 except that the dispersant of Example 1 was changed to graft copolymer I, and each evaluation was performed. Results are shown in Table 7. When the conductive resin composition for electrodes used in Comparative Example 14 was employed, the dispersibility was poor, the viscosity was high, and a high value of the electrode plate resistance was also shown. Furthermore, a low discharge capacity retention rate upon 3 C discharge was shown in the result of the battery evaluation.

TABLE 2

| | | Example 1 | Example 2 | Example 3 | Example 4 |
|---|---|---|---|---|---|
| | Dispersant | Graft copolymer A | Graft copolymer B | Graft copolymer C | Graft copolymer A |
| | Conductive agent | Li-435 | Li-435 | Li-435 | Li-435 |
| | Binding material | PVdF | PVdF | PVdF | PVdF |
| | Mass of dispersant/mass of conductive agent | 0.1 | 0.1 | 0.1 | 0.01 |
| Evaluation of conductive resin composition | Grind gauge [μm] | 5 | 5 | 10 | 15 |
| | Viscosity [Pa · s] | 5.8 | 6.5 | 7.4 | 10.8 |
| | Oxidative degradation electric current value [mA/cm$^2$] | 0.05 | 0.06 | 0.04 | 0.06 |
| Evaluation of electrode composition | Viscosity [Pa · s] | 12.5 | 14.5 | 15.6 | 16.8 |
| Evaluation of electrode | Electrode plate resistance [Ω · cm$^2$] | 240 | 280 | 250 | 320 |
| Evaluation of battery | Capacity retention rate upon 3 C discharge [%] | 82.5 | 81.5 | 82.4 | 80.4 |
| | Discharge capacity retention rate after cycle [%] | 90 | 88 | 89 | 84 |

TABLE 3

| | | Example 5 | Example 6 | Example 7 | Example 8 |
|---|---|---|---|---|---|
| | Dispersant | Graft copolymer A | Graft copolymer A | Graft copolymer A | Graft copolymer A |
| | Conductive agent | Li-435 | Li-435 | Li-435 | CNT |
| | Binding material | PVdF | PVdF | PVdF | PVdF |
| | Mass of dispersant/mass of conductive agent | 0.5 | 1 | 3 | 0.1 |
| Evaluation of conductive resin composition | Grind gauge [μm] | 5 | 5 | 5 | 10 |
| | Viscosity [Pa·s] | 4.7 | 4.2 | 4.2 | 8.1 |
| | Oxidative degradation electric current value [mA/cm$^2$] | 0.05 | 0.04 | 0.03 | 0.05 |
| Evaluation of electrode composition | Viscosity [Pa·s] | 11.8 | 11.6 | 11.5 | 18.1 |
| Evaluation of electrode | Electrode plate resistance [Ω·cm$^2$] | 380 | 420 | 460 | 220 |
| Evaluation of battery | Capacity retention rate upon 3 C discharge [%] | 80.1 | 79.5 | 78.4 | 80.4 |
| | Discharge capacity retention rate after cycle [%] | 87 | 87 | 86 | 91 |

TABLE 4

| | | Example 9 | Example 10 | Example 11 | Comparative Example 1 |
|---|---|---|---|---|---|
| | Dispersant | Graft copolymer A | Graft copolymer A | Graft copolymer A | — |
| | Conductive agent | Li-435 CNT | Li-250 | ECP | Li-435 |
| | Binding material | PVdF | PVdF | PVdF | PVdF |
| | Mass of dispersant/mass of conductive agent | 0.1 | 0.1 | 0.1 | — |
| Evaluation of conductive resin composition | Grind gauge [μm] | 15 | 5 | 10 | 30 |
| | Viscosity [Pa·s] | 7.1 | 3.1 | 5.9 | 18.5 |
| | Oxidative degradation electric current value [mA/cm$^2$] | 0.04 | 0.05 | 0.06 | 0.07 |
| Evaluation of electrode composition | Viscosity [Pa·s] | 17.1 | 10.3 | 16.1 | 42.5 |
| Evaluation of electrode | Electrode plate resistance [Ω·cm$^2$] | 200 | 520 | 320 | 1100 |
| Evaluation of battery | Capacity retention rate upon 3 C discharge [%] | 85.6 | 75.5 | 81.5 | 73.5 |
| | Discharge capacity retention rate after cycle [%] | 92 | 85 | 90 | 74 |

TABLE 5

| | | Comparative Example 2 | Comparative Example 3 | Comparative Example 4 | Comparative Example 5 |
|---|---|---|---|---|---|
| | Dispersant | Graft copolymer D | Graft copolymer E | Graft copolymer F | Graft copolymer G |
| | Conductive agent | Li-435 | Li-435 | Li-435 | Li-435 |
| | Binding material | PVdF | PVdF | PVdF | PVdF |
| | Mass of dispersant/mass of conductive agent | 0.1 | 0.1 | 0.1 | 0.1 |
| Evaluation of conductive resin composition | Grind gauge [µm] | 25 | 30 | 25 | 25 |
| | Viscosity [Pa · s] | 17.5 | 16.3 | 20.4 | 19.4 |
| | Oxidative degradation electric current value [mA/cm$^2$] | 0.05 | 0.06 | 0.05 | 0.05 |
| Evaluation of electrode composition | Viscosity [Pa · s] | 38.4 | 36.6 | 41.8 | 40.9 |
| Evaluation of electrode | Electrode plate resistance [Ω · cm$^2$] | 840 | 1150 | 1050 | 1240 |
| Evaluation of battery | Capacity retention rate upon 3 C discharge [%] | 74.1 | 73.1 | 70.8 | 69.8 |
| | Discharge capacity retention rate after cycle [%] | 75 | 71 | 72 | 68 |

TABLE 6

| | | Comparative Example 6 | Comparative Example 7 | Comparative Example 8 | Comparative Example 9 |
|---|---|---|---|---|---|
| | Dispersant | Polyvinyl alcohol | Polyacrylonitrile | Polyvinyl alcohol Polyacrylonitrile | Polyvinylpyrrolidone |
| | Conductive agent | Li-435 | Li-435 | Li-435 | Li-435 |
| | Binding material | PVdF | PVdF | PVdF | PVdF |
| | Mass of dispersant/mass of conductive agent | 0.1 | 0.1 | 0.1 | — |
| Evaluation of conductive resin composition | Grind gauge [µm] | 10 | 30 | 20 | 10 |
| | Viscosity [Pa · s] | 10.1 | 17.5 | 15.6 | 5.1 |
| | Oxidative degradation electric current value [mA/cm$^2$] | 0.24 | 0.06 | 0.11 | 0.75 |
| Evaluation of electrode composition | Viscosity [Pa · s] | 21.5 | 38.5 | 25.6 | 13.1 |
| Evaluation of electrode | Electrode plate resistance [Ω · cm$^2$] | 340 | 980 | 570 | 310 |
| Evaluation of battery | Capacity retention rate upon 3 C discharge [%] | 75.5 | 70.5 | 72.4 | 81.5 |
| | Discharge capacity retention rate after cycle [%] | 78 | 71 | 74 | 89 |

TABLE 7

|  |  | Comparative Example 10 | Comparative Example 11 | Comparative Example 12 | Comparative Example 13 | Comparative Example 14 |
|---|---|---|---|---|---|---|
| Dispersant |  | Polyoxyethylene alkyl ether | Polyvinyl-pyrrolidone Polyoxyethylene alkyl ether | Graft copolymer A | Graft copolymer H | Graft copolymer I |
| Conductive agent |  | Li-435 | Li-435 | Li-435 | Li-435 | Li-435 |
| Binding material |  | PVdF | PVdF | — | PVdF | PVdF |
| Mass of dispersant/mass of conductive agent |  | 0.1 | 0.1 | 1 | 0.1 | 0.1 |
| Evaluation of conductive resin composition | Grind gauge [μm] | 15 | 5 | 5 | 15 | 30 |
|  | Viscosity [Pa·s] | 7.1 | 4.5 | 3.6 | 12.2 | 18.4 |
|  | Oxidative degradation electric current value [mA/cm$^2$] | 0.45 | 0.67 | 0.03 | 0.05 | 0.06 |
| Evaluation of electrode composition | Viscosity [Pa·s] | 14.5 | 11.8 | 12.2 | 31.5 | 42.1 |
| Evaluation of electrode | Electrode plate resistance [Ω·cm$^2$] | 340 | 270 | 840 | 520 | 970 |
| Evaluation of battery | Capacity retention rate upon 3 C discharge [%] | 79.5 | 81.7 | 71.5 | 78.4 | 69.7 |
|  | Discharge capacity retention rate after cycle [%] | 87 | 90 | 81 | 84 | 74 |

It was revealed that the conductive resin compositions for electrodes in Examples 1 to 11 can establish both dispersibility and oxidation resistance compared to the conductive resin compositions for electrodes in Comparative Examples 1 to 14. Due thereto, it was found that the electrode compositions in Examples of the present invention have a low viscosity and that the electrodes employing the electrode compositions have a low electrode plate resistance, thereby suppressing the voltage drop upon discharge.

Furthermore, it was revealed that the lithium ion batteries in Examples 1 to 11 have a high discharge rate property and also have a high cyclability compared to the lithium ion batteries in Comparative Examples 1 to 14. Due thereto, it was found that the lithium ion batteries employing the conductive resin compositions for electrodes of the present invention can suppress the output decline associated with increase in the discharge current, and also have a long life.

REFERENCE SIGNS LIST

1 Positive electrode of lithium ion battery
2 Negative electrode of lithium ion battery
3 Polyolefin microporous membrane
4 Aluminum tab
5 Nickel tab
6 Exterior
7 Active material
8 Conductive agent

The invention claimed is:

1. A conductive resin composition for electrodes, comprising a dispersant, a conductive agent, and a binding material, wherein:
the dispersant comprises a graft copolymer in which a monomer containing acrylonitrile as a main component is grafted onto polyvinyl alcohol;
the average degree of polymerization of the polyvinyl alcohol is 300 to 3,000, and the degree of saponification of the same is 90 mol % to 100 mol %; and
the polyvinyl alcohol content and the polyacrylonitrile content in the graft copolymer are, respectively, 10 mass % to 40 mass % and 90 mass % to 60 mass %, wherein the conductive resin composition has a viscosity, measured at a shear velocity of 0.1 s$^{-1}$, of 11 Pa·s or less.

2. The conductive resin composition for electrodes according to claim 1, wherein the mass ratio of the dispersant to the conductive agent (mass of the dispersant/mass of the conductive agent) is 0.01 to 1.

3. The conductive resin composition for electrodes according to claim 1, wherein the binding material comprises polyvinylidene fluoride.

4. The conductive resin composition for electrodes according to claim 1, wherein the conductive agent comprises at least one selected from the group consisting of (i) a fibrous carbon, (ii) a spherical carbon, and (iii) a carbon composite in which a fibrous carbon and a spherical carbon are interconnected.

5. An electrode composition comprising the conductive resin composition for electrodes according to claim 1 and an active material.

6. The electrode composition according to claim 5, wherein the active material is at least one selected from $LiCoO_2$, $LiMn_2O_4$, $LiNiO_2$, $LiMPO_4$, $Li_2MSiO_4$, $LiNi_xMn_{(2-x)}O_4$, $Li(Mn_xNi_yCo_Z)O_2$, $Li(Al_xNi_yCo_Z)O_2$, and $xLi_2MnO_3$-$(1-x)LiMO_2$, wherein
X in $LiNi_xMn_{(2-x)}O_4$ satisfies the relation 0<X<2,
X, Y, and Z in $Li(Mn_xNi_yCo_Z)O_2$ and $Li(Al_xNi_yCo_Z)O_2$ satisfy the relation X+Y+Z=1, and each satisfies the relation 0<X<1, 0<Y<1, and 0<Z<1,
x in $xLi_2MnO_3$-$(1-x)LiMO_2$ satisfies the relation 0<x<1, and
M in $LiMPO_4$, $Li_2MSiO_4$, and $xLi_2MnO_3$-$(1-x)LiMO_2$ is at least one element selected from Fe, Co, Ni, and Mn.

7. An electrode having a layer comprising the electrode composition according to claim 5 on a metal foil.

8. A lithium ion battery having the electrode according to claim 7 as a positive electrode.

* * * * *

UNITED STATES PATENT AND TRADEMARK OFFICE
CERTIFICATE OF CORRECTION

| | | |
|---|---|---|
| PATENT NO. | : 11,028,209 B2 | Page 1 of 1 |
| APPLICATION NO. | : 16/320646 | |
| DATED | : June 8, 2021 | |
| INVENTOR(S) | : Tatsuya Nagai et al. | |

It is certified that error appears in the above-identified patent and that said Letters Patent is hereby corrected as shown below:

On the Title Page

Item [54], and In the Specification Column 1 Line 1 should read:
CONDUCTIVE RESIN COMPOSITION FOR ELECTRODES, ELECTRODE COMPOSITION, AND ELECTRODE AND LITHIUM ION BATTERY USING SAME Signed and Sealed this
Tenth Day of May, 2022

Katherine Kelly Vidal
*Director of the United States Patent and Trademark Office*